(12) United States Patent
Dobler

(10) Patent No.: US 11,374,357 B2
(45) Date of Patent: Jun. 28, 2022

(54) CHASSIS CONNECTOR

(71) Applicant: Neutrik AG, Schaan (LI)

(72) Inventor: Oliver Dobler, Tschagguns (AT)

(73) Assignee: Neutrik AG, Schaan (LI)

(*) Notice: Subject to any disclaimer, the term of this patent is extended or adjusted under 35 U.S.C. 154(b) by 0 days.

(21) Appl. No.: 17/094,780

(22) Filed: Nov. 10, 2020

(65) Prior Publication Data

US 2021/0143577 A1 May 13, 2021

(30) Foreign Application Priority Data

Nov. 11, 2019 (AT) .............................. A50959/2019

(51) Int. Cl.
*H01R 13/717* (2006.01)
*H01R 13/627* (2006.01)
*H01R 12/71* (2011.01)

(52) U.S. Cl.
CPC ....... *H01R 13/6272* (2013.01); *H01R 12/716* (2013.01); *H01R 13/7175* (2013.01)

(58) Field of Classification Search
CPC .............. H01R 13/6272; H01R 12/716; H01R 13/7175; H01R 13/633; H01R 12/722; H01R 24/64; H01R 13/7172; H01R 13/465; H01R 13/717; H01R 13/502; H01R 13/627; H01R 13/665; H01R 13/639; G02B 6/3897; G02B 6/3817
See application file for complete search history.

(56) References Cited

U.S. PATENT DOCUMENTS

| | | | |
|---|---|---|---|
| 5,790,041 A | 8/1998 | Lee | |
| 6,076,975 A * | 6/2000 | Roth | G02B 6/3825 385/76 |
| 6,200,160 B1 * | 3/2001 | Drexler | G02B 6/3897 439/536 |
| 6,241,550 B1 | 7/2001 | Laity et al. | |

(Continued)

FOREIGN PATENT DOCUMENTS

| | | |
|---|---|---|
| CN | 1328718 A | 12/2001 |
| CN | 101593900 A1 | 5/2008 |

(Continued)

OTHER PUBLICATIONS

IP Australia, Examination Report for AU Application No. 2020260521, dated Jun. 10, 2021, 6 pages.

(Continued)

*Primary Examiner* — Abdullah A Riyami
*Assistant Examiner* — Nelson R. Burgos-Guntin
(74) *Attorney, Agent, or Firm* — Stoel Rives LLP

(57) ABSTRACT

A chassis connector comprises a housing with an insertion opening (2) for a complementary cable connector, a contact carrier inserted in the housing (1) or formed therein, electrical or optical contacts fixed in the contact carrier, and a front plate which is arranged on the front side of the housing and which, together with an annular ridge extending along at least a part of the circumference of the insertion opening, forms the front end and the outer delimitation of the insertion opening. The front plate is made of a light-dispersing or light-conducting material and has at least one coupling surface for light from an external light source.

20 Claims, 3 Drawing Sheets

(56) References Cited

U.S. PATENT DOCUMENTS

| | | | | |
|---|---|---|---|---|
| 6,368,159 B1* | 4/2002 | Hess | | H01R 13/6641 |
| | | | | 385/901 |
| 6,690,804 B2 | 2/2004 | Everett | | |
| 6,749,438 B1* | 6/2004 | Scheller | | B60D 1/62 |
| | | | | 439/35 |
| 7,036,948 B1* | 5/2006 | Wyatt | | H01R 13/6683 |
| | | | | 362/276 |
| 7,118,379 B1* | 10/2006 | Wang | | H01R 13/6641 |
| | | | | 439/35 |
| 8,226,284 B2 | 7/2012 | Markyvech et al. | | |
| 8,574,001 B2 | 11/2013 | Lee | | |
| 9,666,974 B2* | 5/2017 | Bopp | | H01R 13/518 |
| 10,505,326 B2* | 12/2019 | Chien | | H02G 3/14 |
| 10,811,805 B2 | 10/2020 | Yamanaka | | |
| 11,121,513 B2 | 9/2021 | Chien et al. | | |
| 2005/0266732 A1* | 12/2005 | Karir | | H01R 13/64 |
| | | | | 439/676 |
| 2006/0045457 A1* | 3/2006 | Ng | | G02B 6/3895 |
| | | | | 385/134 |
| 2012/0190228 A1 | 7/2012 | Lee | | |
| 2013/0316583 A1* | 11/2013 | Scherer | | H01R 13/6658 |
| | | | | 439/620.23 |
| 2014/0213100 A1* | 7/2014 | Xuan | | H01R 13/7172 |
| | | | | 439/490 |
| 2014/0219615 A1* | 8/2014 | Petersen | | G02B 6/428 |
| | | | | 385/88 |
| 2015/0340826 A1 | 11/2015 | Chien | | |
| 2016/0359284 A1* | 12/2016 | Hsu | | H01R 12/716 |
| 2017/0149176 A1* | 5/2017 | Kamemura | | H01R 13/74 |
| 2018/0026387 A1* | 1/2018 | Annis | | H01R 13/502 |
| | | | | 439/686 |
| 2018/0219313 A1* | 8/2018 | Sauer | | H01R 13/629 |
| 2019/0052025 A1* | 2/2019 | Buechli | | H01R 13/7175 |
| 2019/0058283 A1* | 2/2019 | Scanzillo | | H01F 7/064 |
| 2019/0103699 A1* | 4/2019 | Yamanaka | | H01R 13/6581 |
| 2020/0205632 A1* | 7/2020 | Gschrey | | A47L 9/2842 |
| 2020/0266618 A1* | 8/2020 | Montana | | H02G 3/14 |
| 2021/0143577 A1* | 5/2021 | Dobler | | H01R 13/7172 |
| 2021/0167559 A1* | 6/2021 | Mattei | | H01R 13/41 |

FOREIGN PATENT DOCUMENTS

| | | |
|---|---|---|
| CN | 101922679 B | 12/2010 |
| CN | 102856745 A | 1/2013 |
| CN | 105261901 A | 1/2016 |
| CN | 207705505 U | 8/2018 |
| CN | 208849186 U | 5/2019 |
| CN | 109869665 A | 6/2019 |
| CN | 209169538 U | 7/2019 |
| CN | 110417974 A | 11/2019 |
| DE | 102010021587 A1 | 1/2011 |
| EP | 2904982 A1 | 8/2015 |
| EP | 2361452 B1 | 9/2017 |
| EP | 3462820 A2 | 4/2019 |
| JP | 2010050110 A | 3/2010 |
| JP | 2016195123 A | 11/2016 |
| NL | 1032887 C2 | 10/2008 |
| RU | 2546642 C2 | 4/2015 |
| WO | 2020088149 A1 | 5/2020 |

OTHER PUBLICATIONS

European Patent Office, Search Report for EP Application No. 20020516.9, dated Mar. 11, 2021, 10 pages.

Rospatent, Search Report for Russian Patent Application No. 2020136756/07, dated Dec. 3, 2021, 2 pages.

* cited by examiner

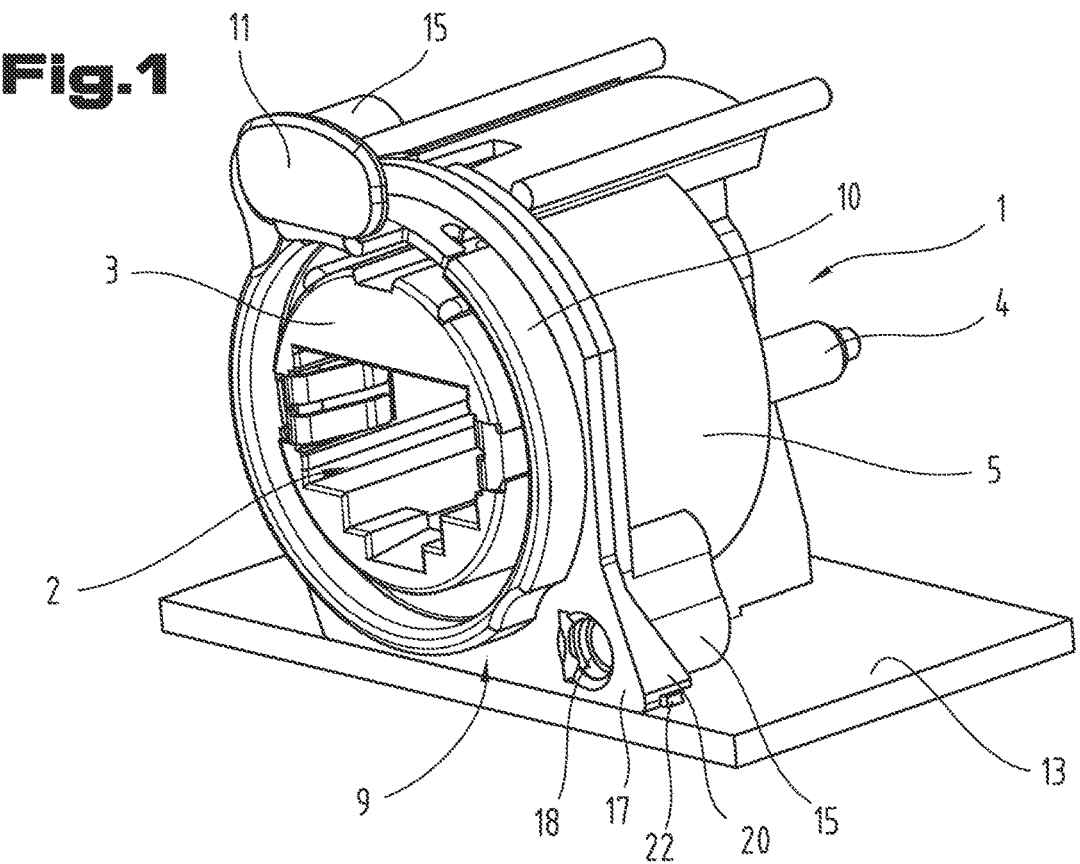
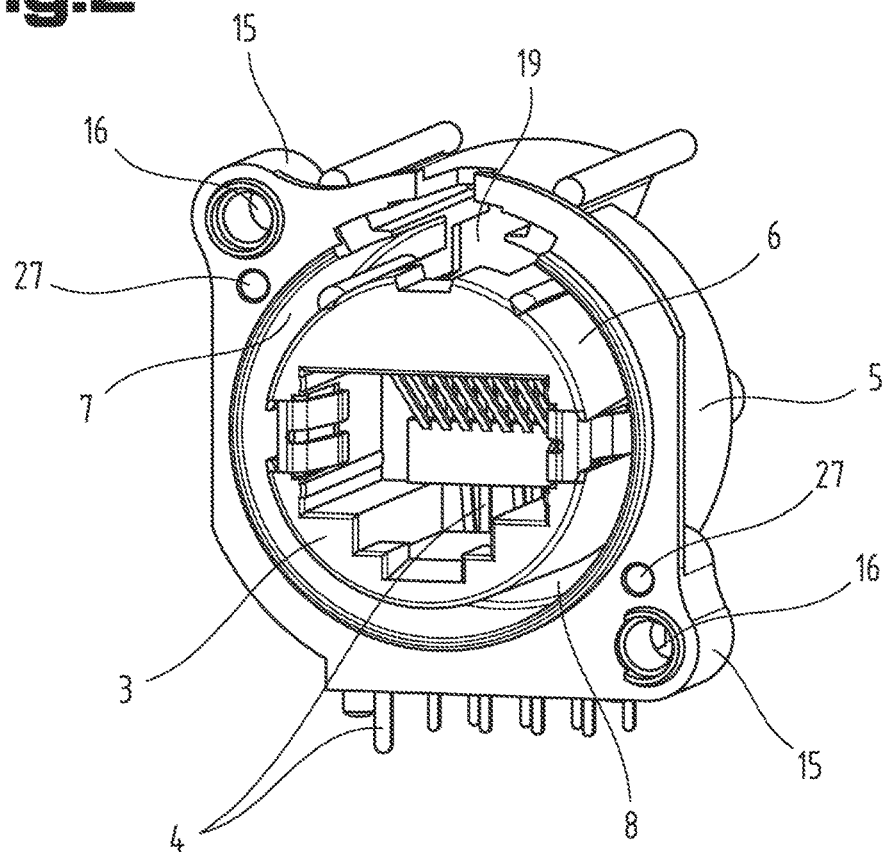

CHASSIS CONNECTOR

RELATED APPLICATION

This application claims the benefit of priority under 35 U.S.C. § 119 of Austrian Patent Application No. A50959/2019, which is incorporated herein by reference.

OVERVIEW

The present disclosure relates to a chassis connector having a housing with an insertion opening for a complementary cable connector, with a contact carrier inserted in the housing or formed therein, with electrical or optical contacts fixed in the contact carrier, and with a front plate which is arranged on the front side of the housing, as well as a chassis connector arrangement comprising such a chassis connector and a circuit board connected thereto.

Such chassis connectors, also called built-in sockets or chassis sockets, are intended for being built into control panels, control cabinets also in the walls of device housings and configured for being connected to standard conductor boards and/or circuit boards which are used in the entertainment industry. They are available in a wide variety of embodiments, meaning having different numbers and designs of the contacts, and with different ground and connection variants, and as male and female plugs. They are used as electrical plug connectors for transmitting electrical energy or analogous and/or digital data and as optical plug connectors for light conductors and optical cables.

Cable plugs are known which have a lighting means supplied by the utility line which illuminates an illumination ring with three windows, each offset by 120 degrees. Furthermore, a system is known from U.S. Pat. No. 6,690,804 B2, in which microphones and their cables are provided with controllable LEDs in order to quickly distinguish the different devices visually by means of different colors. The energy supply is provided via the phantom feed source of the sound mixing system. Moreover, chassis sockets are known, which have a rim surrounding the insertion opening made of multiple LEDs built into the built-in sockets themselves and/or of a narrow ring illuminated by means of built-in LEDs for indicating the connection status. Thus, an energy supply carrying the risk of faults in the signal transmission is integrated into the socket itself here, as well.

CN 208849186 U, NL 1032887 A1, EP 2904982 A1 and DE 102010021587 A1 show built-in or mounted electric sockets of different types, which contain light sources and light-conducting elements. CN 208849186, for example, discloses a charging plug to be built installed in vehicles. The plug has a flange with mounting bores and a cover panel, which has an annular transparent region, covering said flange. A light-conducting element is embedded in the flange, which element is completely encased below the transparent cover panel. The light-conducting element is illuminated by two LEDs which are mounted on a conductor board. For this purpose, the light is coupled in via the two opposing front and/or end sides. The charging status of the vehicle can be indicated by a change of color.

NL 1032887 A1 discloses a mounted electric socket for a trailer for motor vehicles. The electric socket has two mounting bores. Oblong contacts protrude in parallel to one another from a disc-shaped contact carrier, wherein a guide cylinder made of a light-conducting material is slid onto the contacts. Moreover, a hollow cylindrical socket is present, which surrounds the cylinder with the contacts in an annular manner while forming an annular intermediate space, also made of a light-conducting material—The guide cylinder and the socket are illuminated separately by at least one LED each. The encasing housing has a spring-loaded lid which, in a closed state, covers the entire insertion opening, and which has a furcate recess with which an inserted plug can be fixed/locked, wherein again, a majority of the insertion opening is covered.

EP 2904982 A1 describes a socket insert for an electrosurgical device. Translucent frames are provided around the actual plug sockets and/or their insertion openings which, for example, can be used as an operating state indicator, wherein light from a light source is coupled into the translucent frame via a slide-in housing configured as a light conductor. In this regard, the light source is preferably formed by a backlighting conductor board having light-emitting diodes in the device housing. An unlockable catch means for the cable plugs is also present.

Lastly, DE 102010021587 A1 discloses a multipolar charging socket for electric vehicles with a housing having a locking function, which housing has a flange-type edge. Parts of the housing can consist of a translucent, if necessary also colored, material, wherein light sources are arranged in the housing.

Certain embodiments of the invention disclosed herein may overcome disadvantages of the prior art and provide a chassis connector and/or an arrangement having such a connector, which comprise a status indication that can be identified easily, particularly in dark surroundings, and as unhindered as possible at any time, in which there is no risk of a fault or influence of the utility signals, and which can be produced without great effort due to a simple design, and which preferably also allow the upgrade of existing chassis connectors with a similar design.

Additionally, devices according to the present disclosure may include a front plate that is made of a light-dispersing or light-conducting material, and may have at least one coupling surface for light from an external light source and a circumferential ridge that is raised toward the front, which ridge extends along at least a part of the circumference of the insertion opening and forms the front end and the outer delimitation of the insertion opening. Thus, an optimal supply and distribution of the coupled-in light is ensured and the optimal identifiability of the visible section of the front plate is warranted at any time, wherein, however, the light source, its energy supply, and its control are separate from the chassis connector itself and its utility contacts, so that the risk of the utility signals being influenced by the illumination arrangement is minimized.

Preferably, the front plate is made of colorless material. Thus, using light sources with different coloring, it is possible to show different colors and also changing colors with only one front plate.

A preferred embodiment of the chassis connector provides, for making possible the installation behind the walls of devices, control panels or suchlike, that the housing and the front plate have corresponding mounting sections which radially protrude with respect to the axis of the insertion opening and are provided with at least one mounting bore.

In the case of such a chassis connector, the coupling surface is preferably arranged on at least one of the mounting sections of the front plate. Thus, it is possible to design the coupling surface very freely and optimal for coupling in the light respective source used.

Moreover, a preferred variant provides that the coupling surface is oriented radially, wherein it is preferably provided that the cross-section of the mounting section increases toward the coupling surface. This allows the easy coupling of a light source arranged so as to be adjacent to the front plate, and the optimal light conduction while focusing the coupled light onto the cross-section of the part of the front plate to be illuminated in any case.

A further optional embodiment of the invention provides a chassis connector, in which a recess for a locking arrangement for the cable plug is formed in the housing, wherein the locking arrangement comprises an unlocking element protruding forward out of the housing, and wherein the front plate has a cutout for passing through the unlocking element.

Benefits may also be achieved by means of a chassis connector arrangement which comprises a chassis connector according to one of the preceding paragraphs as well as a circuit board connected thereto. This arrangement is further characterized in that a light source and its control and energy supply are provided on the circuit board, and at least the light source is arranged immediately adjacent to the coupling location. Thus, the light supply remains separate, in terms of potential, from the utility contacts and cannot influence the signal transmission.

The light source is preferably configured and/or controllable for emitting light of at least two different colors in order to distinguish the individual sockets and/or for indicating the respective connection status.

An alternative embodiment then provides that the control of the light source is coupled with a circuit for determining different statuses of the arrangement, and the control is designed such that different statuses are marked by the emission of light in different colors.

The light source preferably comprises LEDs or OLEDs as lighting means.

For the purpose of better understanding of the invention, it will be elucidated in more detail by means of the drawing figures below.

Additional aspects and advantages will be apparent from the following detailed description of preferred embodiments, which proceeds with reference to the drawing figures.

BRIEF DESCRIPTION OF THE DRAWINGS

The drawing figures show in a respectively very simplified schematic representation:

FIG. 1—a chassis connector arrangement in the form of a RJ45 chassis socket in a perspective front view, FIG. 2—the housing of the chassis connector of the arrangement of FIG. 1 with inserted contacts in a perspective front view, FIG. 3—the front plate of the chassis connector of the arrangement of FIG. 1 in a perspective front view, FIG. 4—the front plate of the chassis connector of the arrangement of FIG. 1 in a perspective rear view, FIG. 5—a longitudinal section through the chassis connector arrangement of FIG. 1, inserted into the wall of a device or suchlike, and FIG. 6—a perspective top view of a circuit board for the chassis connector arrangement of FIG. 1.

DETAILED DESCRIPTION OF PREFERRED EMBODIMENTS

Figure 3:
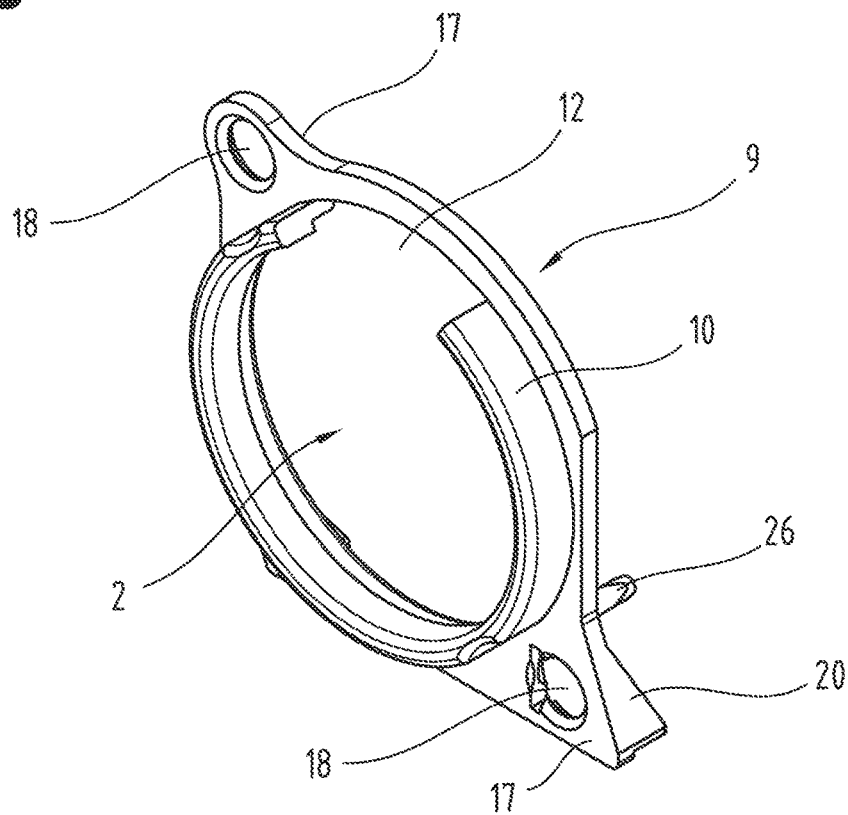

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

In the following, embodiments of the present disclosure are explained with the aid of an electrical chassis connector depicted in its entirety in FIG. 1, which chassis connector is configured in a form as a RJ45 socket for data transmission. However, all kinds of energy and data plugs can be configured in accordance with the novel features disclosed herein, for example following the XLR standard, in male and female design etc. Optical chassis connectors, as well, can be designed substantially similar.

With reference to FIG. 1, a contact carrier 3 is inserted in a housing 1 having an insertion opening 2 for a complementary cable connector. The contacts 4 fixed in the contact carrier 3 protrude at the rear side of the housing 1. The housing 1 is—as can be seen better in FIG. 2—made up of two concentrically arranged housing parts, an exterior housing part 5 and an interior housing part 6, which are spaced from one another by an annular gap 7, wherein said annular gap 7 forms an annular insertion opening for a plug projection, in the form of a socket, of a complementary cable connector. An annular bottom 8 connects the two housing parts 5, 6 at the end of the housing 1 located opposite the insertion opening 2. In this case, the contact carrier 3 can preferably be an integral part and/or section of the housing 1, however, it can also be embodied as a separate part and be inserted into a corresponding receptacle in the housing 1. In the present exemplary embodiment, this receptacle is the inner housing part 6 in which the contact carrier 3 is inserted. In this type of construction, the housing 1 is typically made of metal and the contact carrier 3 of an insulating material, preferably plastic. In the case of plastic housings, the contact carrier 3 is preferably provided as a single piece with the housing 1 as its central portion.

A front plate 9 is arranged on the front side of the housing 1 and surrounds the front section of the contact carrier 3. The front plate 9, which is preferably supported on the front side of the housing 1 and/or covers at least a substantial part of the housing 1, has a circumferential ridge 10 that is raised toward the front, which ridge 10 extends along at least a part, preferably the largest part, of the circumference of the insertion opening 2 and, in doing so, forms the front end and the outer delimitation of the insertion opening 2.

The chassis connector arrangement depicted in FIG. 1 further comprises a locking mechanism for the plugged-in complementary plug connector for preventing an inadvertent pulling removal and thus a release of the plug connection. This mechanism has an unlocking element 11 for the deliberate unlocking of the connection, which unlocking element 11 protrudes forward through recesses 19 in the housing 1 and/or recesses of the front plate 9, in particular through cutouts 12 in the ridge 10 on the outside of the insertion opening 2. In doing so, the unlocking element 11, however, does not cover the annular gap 7 of the insertion opening and the region of the insertion opening and of the contact carrier 3 enclosed by it, so that the front plate 9 or at least the ridge 10 of it is visible at any time.

Lastly, in FIG. 1, the conductor board and/or circuit board 13 is shown, arranged horizontally here, wherein the housing 1 and the contact 4 are then provided with angled end pieces.

Figure 4:
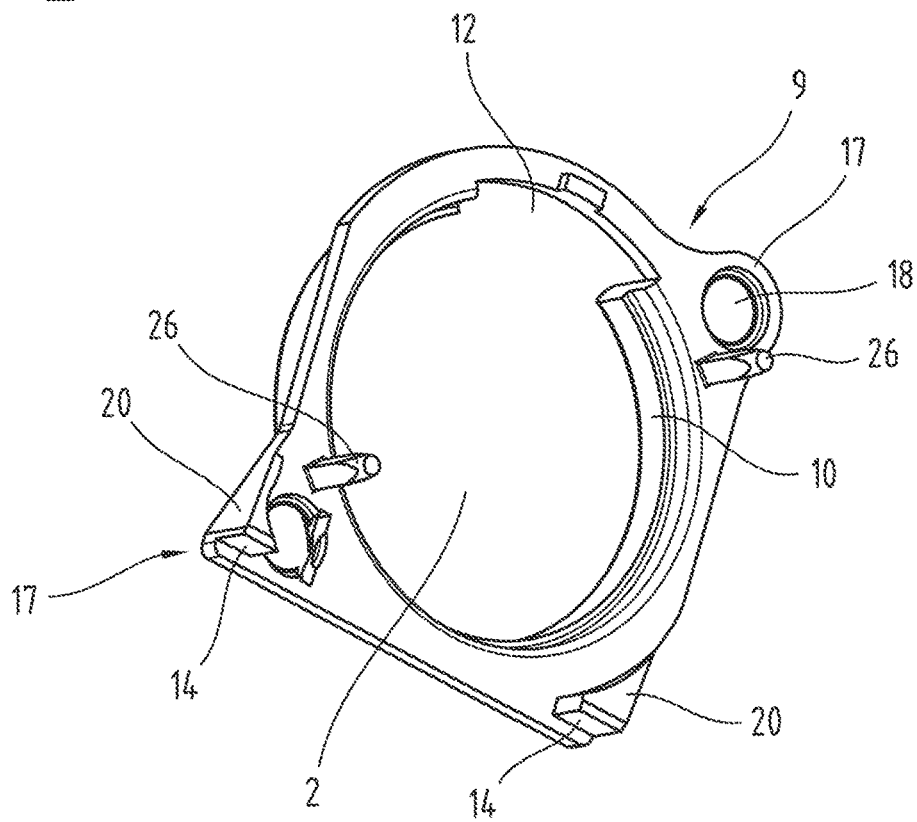

The front plate individually depicted in FIGS. 3 and 4 is made of a light-dispersing or light-conducting material. It has at least one coupling surface 14 for light from an external light source 22. Preferably, in case of a horizontal conductor board installation, two coupling surfaces 14 are present on both sides of the housing 1, immediately adjacent to the circuit board 13. In the present case, these coupling surfaces 14 are oriented so as to be tangential, meaning their surface normal extends tangentially to the insertion opening 2. A radial arrangement of the coupling surfaces 14 is also very useful for coupling light into the front plate 9, which itself is preferably made of colorless material for the use with light sources 22 of any color. Other variants for the orientation of the coupling surfaces 14 are also possible. Hence, the coupling surfaces 14 can, for example, have a rearward orientation and can preferably be located in a plane perpendicular to the longitudinal axis of the chassis connector in order to be supplied with light from a light source 22 on a conductor board 13 built on the rear side of the housing 1.

Figure 5:
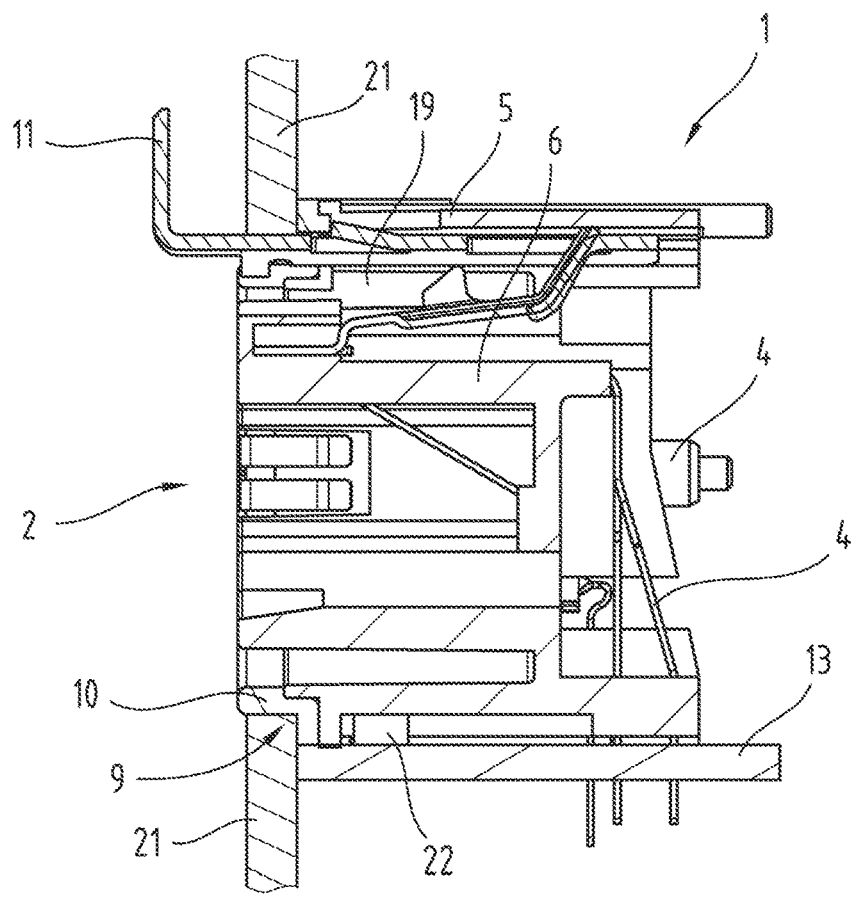
Figure 6:
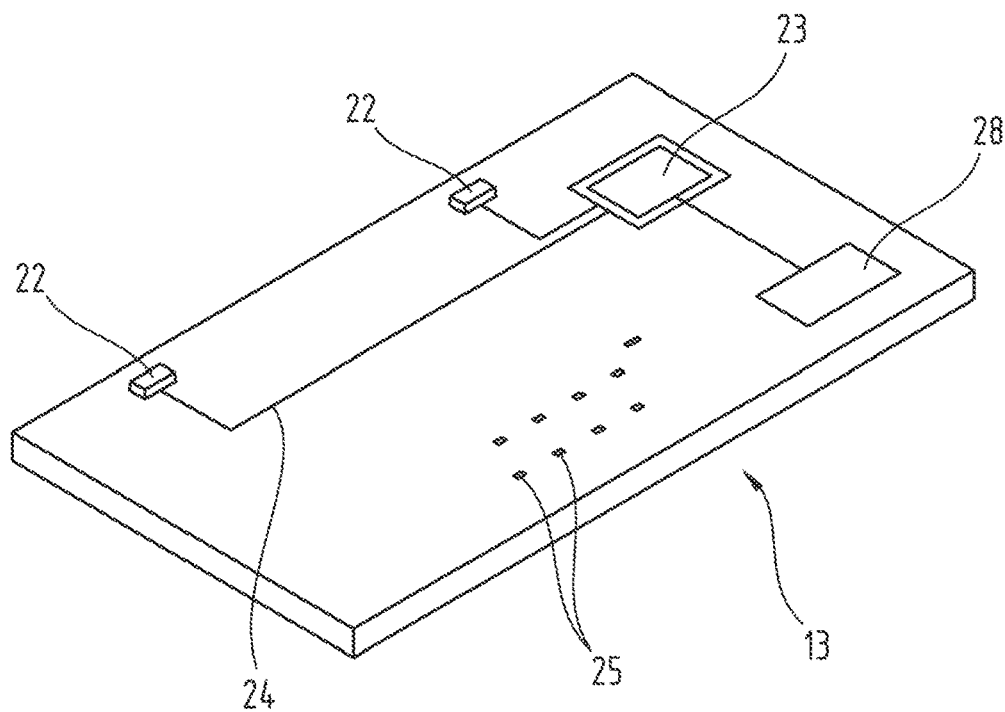

As the chassis connector arrangements are provided for being installed in devices or control cabinets, control panels or the like, at least the housing 1 has mounting sections 15 along its circumference, in which mounting sections 15 mounting bores 16 are formed for affixing the arrangement on the wall 21 of the device or of the control panel or the like (as it can be seen by way of example in the longitudinal section of FIG. 5).

In FIG. 5, a preferred embodiment of the chassis connector is depicted, which is constructed to be installed behind the wall of control panels, control cabinets or also on the rear side of the walls of device housings. In this case, the front plate 9 abuts on the rear side of the respective wall, wherein the ridge 10 preferably has such a height that it ends at least at the height of the outside of the wall of the control panel, of the control cabinet or of the device housing or preferably even protrudes to some extent beyond the outside of the wall. In the event that a front cover panel and/or flange is present, the ridge 10 is preferably high enough to end at least at the height of the outside of the cover panel and/or of the flange, or preferably even protrudes to some extent beyond their front face. The cover panel and/or the flange then preferably has recesses aligning with the recesses 19, through which the unlocking element 11 is passed.

Embodiments of the chassis connector could also be constructed for the installation from the front, wherein preferably also a front cover panel and/or a flange is provided. In order to form the front plate 9, the ridge 10 and the further components, the same features that have been explained in the previous paragraph are provided.

Preferably, mounting sections 17 having mounting bores 18 are present also on the front plate 9 at corresponding locations. Here, it is particularly preferred for the coupling surfaces 14 to be arranged on at least one of the mounting sections 17 of the front plate 9. As it can be seen particularly clearly in FIG. 5, a section 20 with an increasing cross-section toward the coupling surface 14 is preferably provided between the front plate 9, i.e. the regions to be illuminated, and the coupling surfaces 14. The section 20 can be designed to be wedge-shaped, pyramidal, conical or similar.

Moreover, dowel pins 26 are preferably arranged on the rear side of the front plate 9 facing the housing 1 and protrude perpendicular and parallel to the longitudinal axis of the housing 1 toward the housing 1. They engage, when the front plate 9 is fit on the housing 1 so as to abut, with bores 27 on the outside of the housing 1, preferably of the exterior housing part 5, and provide for the correct positioning of the housing 1 and the front plate 9 relative to one another. Furthermore, these two components are then coupled for the handling and especially for the installation in a device, a control panel, a control cabinet or the like and can be handled as a joint part, which substantially facilitates the installation.

The light source 22 for the light to be coupled into the front plate 9 via the coupling surfaces 14 is preferably mounted on the conductor board or circuit board 13. In this regard, the actual lighting means, preferably LEDs or OLEDs, are preferably arranged immediately adjacent to the coupling surface 14. The control 23 and energy supply of the light source, both via cables or also conducting paths 24 on the circuit board 13, thus also stay separate from the contacts 4 in terms of potential. For chassis connector without a circuit board 13 other types of the arrangement of light sources 22 are also possible, for example the "flying" arrangement of wire-bound light sources 22, preferably LEDs or OLEDs.

The light source 22 is preferably configured and/or controllable for emitting light of at least two different colors, for which, for example, multiple lighting means in different colors can be used. The control 23 of the light source 22 can, if necessary, be coupled with a circuit 27 for determining different statuses of the chassis connector arrangement and be configured such that different statuses are indicated by means of emission of light of different colors. The mounting locations 25 on the circuit board 13 for the contacts 4 are also depicted.

The front plate 9 can be formed, as regards its dimensions and design—with the exception of the coupling surfaces 14 and sections 20, which are not substantial to the compatibility, with a varying cross-section—equal to the usually used front plates, so that even the later conversion of existing chassis connectors is possible, together with the affixing of the light sources 22 and their control 23 on the already existing circuit boards 13.

Hence, the advantage of a visual identification and/or a visual indicator of the connection status can also be achieved for existing, converted chassis connector arrangements. It is also possible to visualize different diagnostic notices by using even more colors.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field. The scope of the present invention should, therefore, be determined only by the claims.

The invention claimed is:

1. A chassis connector comprising a housing with an insertion opening for a complementary cable connector, with a contact carrier inserted in the housing or formed therein, with electrical or optical contacts fixed in the contact carrier, and with a front plate which is arranged on a front side of the housing and surrounding a front section of the contact carrier, the front plate as a whole being made of a light-dispersing or light-conducting material, the front plate having at least one coupling surface for light from an external light source and a circumferential ridge that is raised toward the front, which ridge extends along at least a part of the circumference of the insertion opening and forms the front end and the outer delimitation of the insertion opening.

2. The chassis connector according to claim 1, wherein the front plate consists of a colorless material.

3. The chassis connector according to claim 1, wherein the housing and the front plate have corresponding mounting sections, which radially protrude with respect to an axis of the insertion opening and are provided with at least one mounting bore.

4. The chassis connector according to claim 2, wherein the housing and the front plate have corresponding mounting sections, which radially protrude with respect to an axis of the insertion opening and are provided with at least one mounting bore.

5. The chassis connector according to claim 3, wherein the coupling surface is arranged on at least one of the mounting sections of the front plate.

6. The chassis connector according to claim 5, wherein the coupling surface is oriented radially or tangentially, wherein it is preferably provided that the cross-section of the mounting section increases toward the coupling surface.

7. The chassis connector according to claim 1, wherein a recess for a locking arrangement for the cable plug is formed in the housing, wherein the locking arrangement comprises an unlocking element protruding forward out of the housing, and wherein the front plate has a cutout for passing through the unlocking element.

8. The chassis connector according to claim 3, wherein a recess for a locking arrangement for the cable plug is formed in the housing, wherein the locking arrangement comprises an unlocking element protruding forward out of the housing, and wherein the front plate has a cutout for passing through the unlocking element.

9. The chassis connector according to claim 5, wherein a recess for a locking arrangement for the cable plug is formed in the housing, wherein the locking arrangement comprises an unlocking element protruding forward out of the housing, and wherein the front plate has a cutout for passing through the unlocking element.

10. The chassis connector according to claim 6, wherein a recess for a locking arrangement for the cable plug is formed in the housing, wherein the locking arrangement comprises an unlocking element protruding forward out of the housing, and wherein the front plate has a cutout for passing through the unlocking element.

11. A chassis connector arrangement comprising a chassis connector according to claim 1 connected to a circuit board, with a light source and its control and energy supply provided on the circuit board, and at least the light source is arranged immediately adjacent to the coupling surface.

12. A chassis connector arrangement comprising a chassis connector according to claim 2 connected to a circuit board, with a light source and its control and energy supply provided on the circuit board, and at least the light source is arranged immediately adjacent to the coupling surface.

13. A chassis connector arrangement comprising a chassis connector according to claim 3 connected to a circuit board, with a light source and its control and energy supply provided on the circuit board, and at least the light source is arranged immediately adjacent to the coupling surface.

14. A chassis connector arrangement comprising a chassis connector according to claim 5 connected to a circuit board, with a light source and its control and energy supply provided on the circuit board, and at least the light source is arranged immediately adjacent to the coupling surface.

15. A chassis connector arrangement comprising a chassis connector according to claim 6 connected to a circuit board, with a light source and its control and energy supply provided on the circuit board, and at least the light source is arranged immediately adjacent to the coupling surface.

16. The arrangement according to claim 11, wherein the light source is configured and/or controllable for emitting light of at least two different colors.

17. The arrangement according to claim 14, wherein the light source is configured and/or controllable for emitting light of at least two different colors.

18. The arrangement according to claim 16, wherein the control of the light source is coupled with a circuit for determining different statuses of the arrangement, and the control is designed such that different statuses are marked by the emission of light in different colors.

19. The arrangement according to claim 16, wherein the light source includes LEDs or OLEDs.

20. The arrangement according to claim 18, wherein the light source includes LEDs or OLEDs.

* * * * *